US008323519B2

(12) United States Patent
Toshishige et al.

(10) Patent No.: US 8,323,519 B2

(45) Date of Patent: Dec. 4, 2012

(54) METHOD FOR MANUFACTURING LIQUID DISCHARGE HEAD

(75) Inventors: Mitsunori Toshishige, Kawasaki (JP); Yoshinori Tagawa, Yokohama (JP); Hideo Tamura, Kawasaki (JP); Taichi Yonemoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 12/142,541

(22) Filed: Jun. 19, 2008

(65) Prior Publication Data

US 2008/0317971 A1 Dec. 25, 2008

(30) Foreign Application Priority Data

Jun. 20, 2007 (JP) ................................ 2007-162488

(51) Int. Cl.
*G01D 15/00* (2006.01)
*G11B 5/127* (2006.01)

(52) U.S. Cl. .................. 216/27; 216/2; 216/33; 216/41; 427/532; 427/553

(58) Field of Classification Search .................... 216/27, 216/2, 33, 41; 427/532, 553
See application file for complete search history.

(56) References Cited

U.S. PATENT DOCUMENTS

| | | | | |
|---|---|---|---|---|
| 4,609,427 | A * | 9/1986 | Inamoto et al. | 216/27 |
| 5,300,403 | A * | 4/1994 | Angelopolus et al. | 430/325 |
| 5,478,681 | A * | 12/1995 | Yamasita et al. | 430/7 |
| 6,390,606 | B1 | 5/2002 | Terui et al. | |
| 6,953,530 | B2 * | 10/2005 | Kanri | 216/27 |
| 7,491,648 | B2 * | 2/2009 | Lee | 438/706 |
| 7,523,553 | B2 * | 4/2009 | Ohsumi et al. | 29/890.1 |
| 2005/0093924 | A1 * | 5/2005 | Shiba et al. | 347/45 |
| 2006/0243701 | A1 * | 11/2006 | Ono et al. | 216/27 |
| 2007/0017894 | A1 * | 1/2007 | Murayama et al. | 216/27 |
| 2008/0132600 | A1 * | 6/2008 | Nesvadba et al. | 522/167 |

* cited by examiner

*Primary Examiner* — Nadine Norton
*Assistant Examiner* — Christopher Remavege
(74) *Attorney, Agent, or Firm* — Canon USA Inc IP Division

(57) ABSTRACT

A method for manufacturing a liquid discharge head including a flow path forming member to form a flow path communicating with a discharge port for discharging liquids includes forming an organic material layer on a substrate, applying a soluble resin on the organic material layer to form a resin layer, patterning the resin layer to form a pattern with a shape of the flow path, forming a cover layer as the flow path forming member on the pattern, forming the discharge port to expose a part of the pattern from the cover layer, eluting the pattern from the discharge port to form the flow path, irradiating a substance sticking to a surface of the flow path forming member on which the discharge port is formed with ultraviolet light, wherein the substance contains at least the organic material, and removing the sticking substance.

11 Claims, 6 Drawing Sheets

METHOD FOR MANUFACTURING LIQUID DISCHARGE HEAD

BACKGROUND OF THE INVENTION

1. Field of the Invention

The present invention relates to a method for manufacturing a liquid discharge head which discharges liquids, and more particularly to a method for manufacturing an inkjet recording head.

2. Description of the Related Art

As an example of a liquid discharge head which discharges liquids, an inkjet recording system for discharging inks to a recording medium to perform recording can be cited.

An inkjet recording head applied to the inkjet recording system (liquid jet recording system) generally includes a plurality of minute discharge ports, liquid flow paths, and energy generating elements disposed in a part of the liquid flow paths to generate energy used for discharging liquids. As a conventional method for manufacturing such an inkjet recording head, for example, U.S. Pat. No. 6,390,606 discusses the following method.

First, an adhesive layer is formed on a substrate having energy generating elements formed thereon to improve adhesiveness between a flow path forming member, which is formed later, and the substrate. A soluble resin layer is applied to the adhesive layer and patterned to form a pattern of an ink flow path. Then, a cover resin layer, including an epoxy resin and a photo cationic polymerization initiator, is formed to be an ink flow path wall on the ink flow path pattern, and discharge ports are formed on the energy generating elements by photolithography. Lastly, the soluble resin is eluted and the cover resin layer which becomes a flow path forming member is cured.

However, in an inkjet recording head produced experimentally based on the method discussed in U.S. Pat. No. 6,390,606, the present inventors found that depending on diameters of discharge ports and types of inks, discharged droplets were random and did not land on desired impact positions.

It was observed that very small particulate substances were often sticking near the discharge ports. It is speculated that misted ink droplets called mist generated during ink discharging sticks to the particulate substances to accumulate, so that a direction of the discharged ink droplets was affected by ink puddles sticking to the discharge port surfaces and became random.

A close study of the phenomenon was made and it is considered that the following process causes sticking of particulate substances. That is, the flowpath forming member, the adhesive layer disposed between the member and the substrate, or adhesives were dissolved during manufacturing, and subsequently guided near the discharge ports. As a specific example, a solvent used for applying a member to form a flow path pattern on the adhesive layer causes molecules of the adhesive layer to be lowered, and the low molecule adhesive layer sticks as eluted substances to the discharge port surfaces when the flow path pattern is eluted. A level of sticking of the particulate substances to the discharge port surfaces varies depending on materials for the flow path forming member, the adhesive layer, and the flow path pattern, and the solvent. The materials for the flow path forming member, the adhesive layer, and the flow path pattern may be changed. However, such a change may narrow material options.

As observed in a recent inkjet recording head, very small ink droplets of several picoliters (pl) discharged from the minute discharge ports are easily affected by the ink droplets sticking to the discharge port surfaces as described above.

Thus, it is desired that generation of substances sticking to the discharge port surfaces should be avoided as much as possible to limit an influence on the discharged ink droplets to a minimum.

SUMMARY OF THE INVENTION

The present invention is directed to an inkjet recording head which can reduce puddles of ink mist on a discharge port surface by reducing substances sticking to the surface, and provide good discharging without random droplets even when very small ink droplets are discharged.

According to an aspect of the present invention, a method for manufacturing a liquid discharge head including a flow path forming member defining a flow path communicating with a discharge port adapted to discharge liquids includes, forming an organic material layer on a substrate, applying a soluble resin on the organic material layer to form a resin layer, patterning the resin layer to form a pattern with a shape of the flow path, forming a cover layer as the flow path forming member on the pattern, forming the discharge port to expose a part of the pattern from the cover layer, eluting the pattern from the discharge port to form the flow path, irradiating a substance sticking to a surface of the flow path forming member on which the discharge port is formed with ultraviolet light, wherein the sticking substance contains at least the organic material, and removing the sticking substance.

According to the exemplary embodiments of the present invention, substances sticking to the discharge port surface are reduced, and generation of puddles of ink mist on the surface is suppressed. The exemplary embodiments of the invention can be applied to a resin material normally used for the flow path forming member of the inkjet recording head, and thus does not limit material selectivity within its range.

Further features and aspects of the present invention will become apparent from the following detailed description of the exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

A liquid discharge head of an exemplary embodiment of the present invention can be mounted on an apparatus such as a printer, a copying machine, a facsimile including a communication system, a word processor including a printer unit, or an industrial recording apparatus combined with various processing devices in a complex manner. The liquid discharge head can be used for recording an image in various recording media such as paper, a thread, a fiber, cloth, leather, a metal, plastic, glass, wood, and ceramics. "Recording" used herein means to provide not only a meaningful image such as a character or graphics but also a meaningless image such as a pattern to a recording medium.

"Ink" or "liquid" is herein widely construed as a liquid used for forming an image, a design, or a pattern on a recording medium, or processing ink or a recording medium. The processing of the ink or the recording medium means, for example, improvement of fixing by coagulation and insolubilization of a color material in ink added to the recording medium, improvement of recording quality or color developing, or improvement of image durability.

Figure 1:
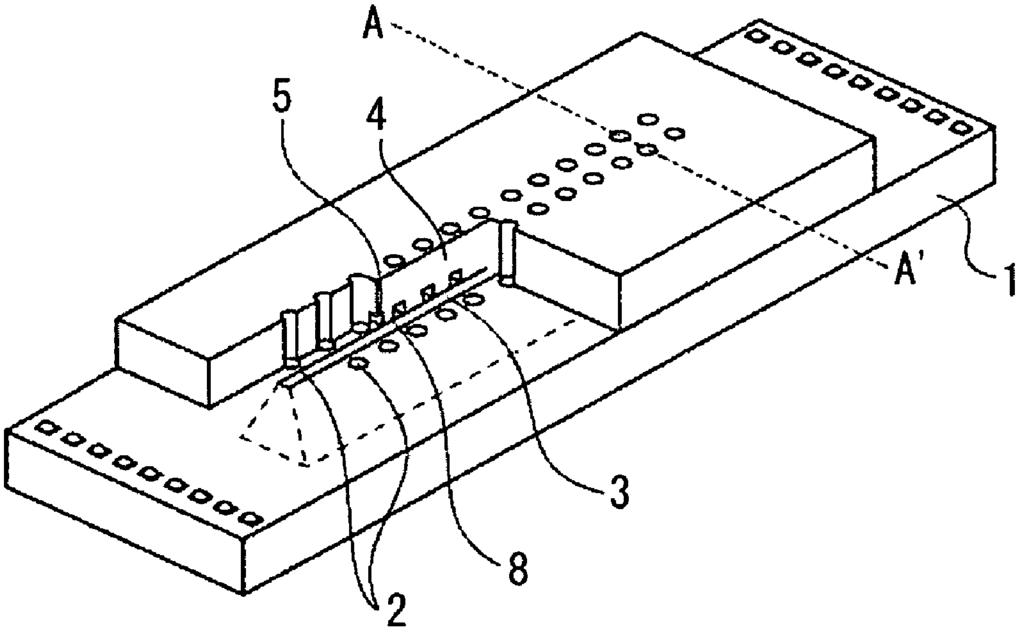
FIG. 1 is a perspective diagram illustrating an example of an inkjet recording head according to an exemplary embodiment of the present invention.

FIG. 1 is a perspective diagram illustrating an example of a recording head according to the exemplary embodiment of the present invention.

The recording head of the exemplary embodiment includes a silicon (Si) substrate 1 in which two rows of energy generating elements (ink discharge energy generating elements) 2 for generating energy used for discharging liquids are arrayed at predetermined pitches. In the substrate 1, an opening of a supply port 3 formed by anisotropically etching Si is located between the two rows of the energy generating elements 2. On the substrate 1, a flow path forming member 4 forms discharge ports 5, which are opened above each energy generating element, and a flow path 8, which communicates with each discharge port 5 and the supply port 3.

The recording head is arranged so that a surface on which the discharge port 5 is formed can face a recording surface of the recording medium. The recording head applies energy generated by the energy generating elements 2 to ink filled into the flow path via the support port 3 and discharges ink droplets from the discharge ports 5 to cause the ink droplets stick to the recording medium and perform recording. For the energy generating elements 2, an electrothermal converter (heater) for generating thermal energy and a piezoelectric element for generating mechanical energy are available. However, the energy generating elements 2 are not limited to these elements.

Figure 2:
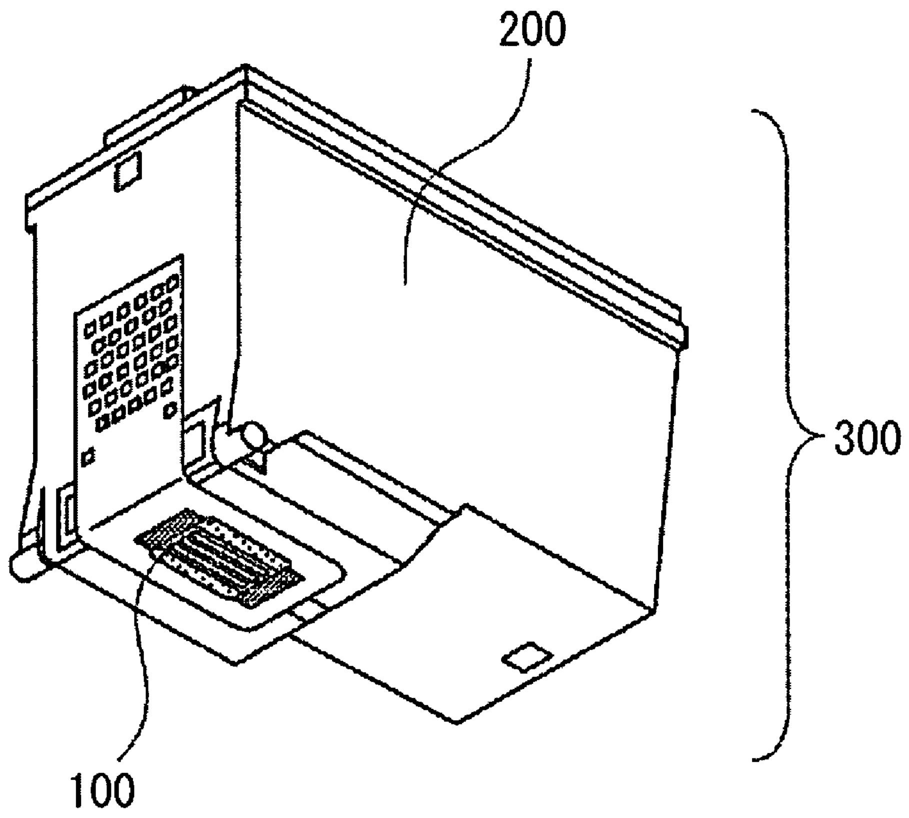
FIG. 2 is a perspective diagram illustrating an example of an inkjet recording head cartridge according to the exemplary embodiment of the present invention.

FIG. 2 is a perspective diagram illustrating an example of an inkjet cartridge 300 which includes the recording head 100 shown in FIG. 1. The inkjet cartridge 300 includes the inkjet recording head 100, and an ink container 200 for storing ink supplied to the inkjet recording head 100, which are integrated with each other. However, these components do not necessarily have to be integrated. The ink container 200 may be configured to be removable.

Each of FIGS. 3A to 3H is a sectional diagram illustrating an example of a method for manufacturing the recording head of the present invention. These sectional diagrams are taken along a line A-A' in FIG. 1 in a plane vertical to the substrate 1.

Figure 3A:
FIGS. 3A to 3H are sectional diagrams illustrating an example of a method for manufacturing the inkjet recording head according to the exemplary embodiment of the present invention.

First, as shown in FIG. 3A, the substrate 1 which includes the energy generating element 2 for generating energy to discharge a liquid is prepared. For the energy generating element 2, an electrothermal converter (heater) or a piezoelectric element can be used as the energy generating element. An electrode (not shown) for inputting a control signal to operate the element is connected to the element. Generally, various functional layers such as protective layers are provided to improve durability of the energy generating element. Such functional layers can also be provided in the present invention.

Figure 3B:
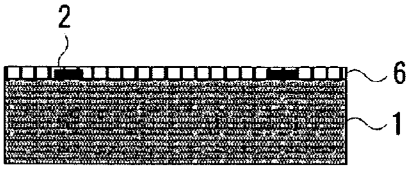

As shown in FIG. 3B, an organic material 6 is formed into a layer on the substrate 1. In a final product of the recording head, the organic material 6 is patterned and positioned between the substrate 1 and the flow path forming member 4. For the organic material 6, a thermoplastic resin is normally used. Specifically, polyether amide, polyimide, polycarbonate, or polyester can be used.

The organic material 6 is provided to improve adhesiveness between the substrate 1, which is normally made of silicon and has a metallic or inorganic surface, and the flow path forming member which is generally made of resins, and to protect the elements on the substrate surface.

Figure 3C:
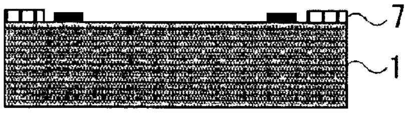

As shown in FIG. 3C, the organic material 6 is patterned to form a patterned organic material layer 7. A patterning can be implemented by photolithography if the organic material 6 is photosensitive. If the organic material 6 is not photosensitive, an etching method can be used.

Figure 3D:
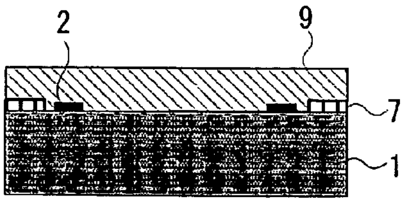

As shown in FIG. 3D, a soluble resin 9 which is dissolved in a solvent is applied on the substrate 1 which includes the organic material layer 7 by spin-coating. For the soluble resin, polymethyl isopropenyl ketone, polyphenyl isopropenyl ketone, polymethyl vinyl ketone, polyphenyl vinyl ketone, or polymethyl methacrylate is used. For the solvent, a nonaqueous solvent cyclohexanone, methyl isobutyl ketone, or xylene, an aqueous solvent methyl lactate or ethyl lactate is used. Because of an influence of the solvent applied on the organic material layer 7, a very small part of the resin forming the organic material layer 7 may be dissolved or molecular weight of the resin may be lowered. Especially, in the case where the ketone solvent such as cyclohexanone having high solvency is used, power of dissolving the organic material layer 7 may be high. Then, a molten mixture of the organic material layer 7 and the soluble resin 9 may be formed at a boundary between the organic material layer 7 and the soluble resin 9.

Figure 3E:
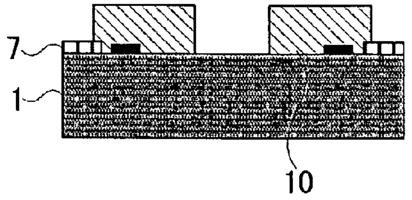

As shown in FIG. 3E, the soluble resin 9 is patterned and forms a pattern 10 of a flow path.

Figure 3F:
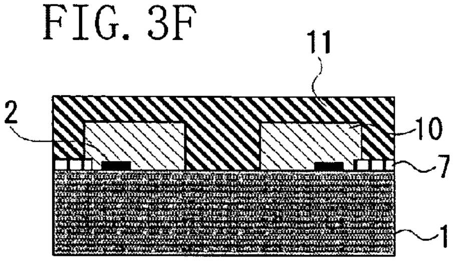

As shown in FIG. 3F, a cover layer 11 for forming a flow path forming member is formed on the substrate 1 which includes the organic material layer 7 and the pattern 10. For forming the cover layer 11, a method in which an epoxy resin and a photoacid generating agent are mixed and applied as a solvent-coating solution is available. Besides this method, however, an inorganic material or a resin can also be selected.

Figure 3G:
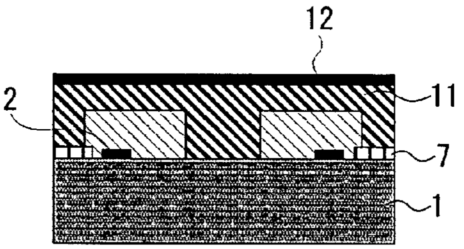

As shown in FIG. 3G, when necessary, surface treatment such as water repelling can be applied on the cover layer 11 (treated place 12). The water-repellent treatment is carried out to prevent sticking of ink mist to the discharge port surface, or improve ink resistance. In addition to water repelling, the surface treatment can improve strength of the discharge port surface. To take an example of the water-repellent treatment, the treated place 12 may be integrated with the member for forming the discharge port, or formed as a water-repellent layer 12. As a material used for the water-repellent treatment, for example, a composition including a condensation product of a hydrolyzable silane compound having a fluorine-containing group can be used. In addition, the material used for the water-repellent treatment can be selected from water-repellent materials whose application to the inkjet heat has been known.

Figure 3H:
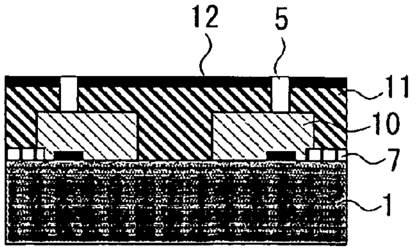

As shown in FIG. 3H, a discharge port 5 is formed through the cover layer 11 and the water-repellent layer 12. A method for forming the discharge port 5 can be selected according to materials of the cover layer 11 and the water-repellent layer 12. Specifically, photolithography or dry etching is used.

Figure 4A:
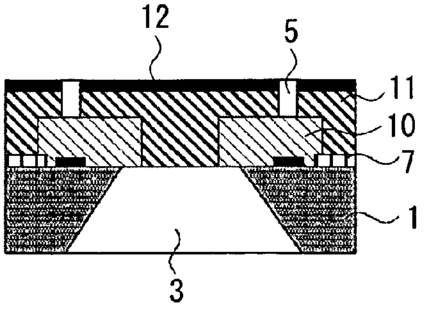
FIGS. 4A to 4E are sectional diagrams illustrating an example of a method for manufacturing the inkjet recording head according to the exemplary embodiment of the present invention.

Then, as shown in FIG. 4A, a supply port 3 is formed in the substrate 1. When the substrate 1 is made of silicon, the supply port 3 can be formed by anisotropic etching of silicon using an aqueous solution of tetra methyl ammonium hydride (TMAH). In addition, other well-known substrate processing methods can be applied.

Figure 4B:
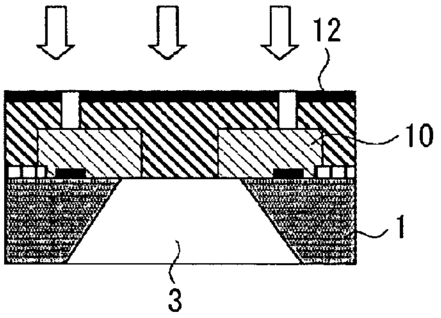

As shown in FIG. 4B, when necessary, the pattern 10 is irradiated with ultraviolet light through the water-repellent layer 12. Accordingly, a molecular chain of the resin forming the pattern 10 can be partially cut off to improve removability. Ultraviolet light of short waves of 300 nm or lower should be used.

Figure 4C:
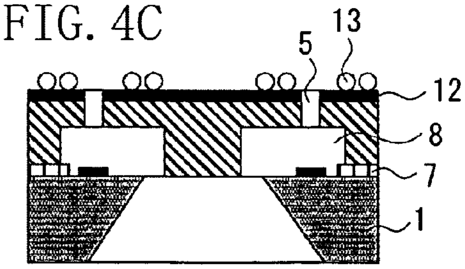

As shown in FIG. 4C, the pattern 10 is dissolved and removed by a solvent. In this case, a sticking substance 13 is on the surface (discharge port surface) on which the discharge port 5 is opened. When the water-repellent layer 12 forms the discharge port surface, a small amount of the sticking substance 13 may stick thereto. As described above, the sticking substance 13 may include a portion of the organic material layer 7 partially dissolved or lowered molecular weight. The level of generation of the sticking substance 13 varies depending on a material of the organic material layer 7, a solvent for applying the soluble resin 9, a solvent for removing the pattern 10, a character of the discharge port surface, heat generated during the process, and ultraviolet light. Especially, when a material for forming the discharge port surface of the water-repellent layer 12 has an affinity for an adhesive layer which becomes a sticking substance, generation of the sticking substances is more conspicuous. The sticking substances can be left as they are if their influence on discharge is ignorable. If not, the sticking substances can be removed by the following process.

Figure 4D:
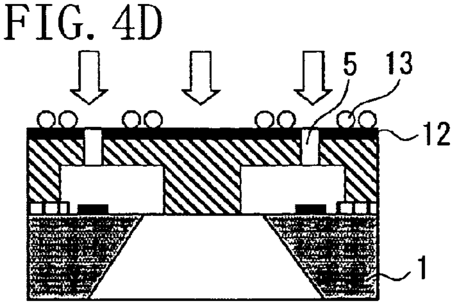

As shown in FIG. 4D, the substance 13 sticking to the surface (water-repellent layer) on which the discharge port 5 is opened is irradiated with ultraviolet light. Through this process, a molecular chain of the substance 13 as a substance sticking to the surface of the water-repellent layer 12 is cut off to improve substance removability. The amount of irradiation is desirably several tens of $J/cm^2$. The entire surface on which the discharge port 5 is provided can be irradiated with the ultraviolet light. Even there is a plurality of the sticking substances 13, molecular weight thereof can be lowered all at once by irradiating the entire surface on which a plurality of the discharge ports are provided.

Figure 4E:
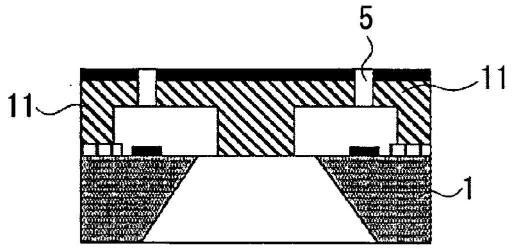

Then, in a wet removing apparatus, the sticking substance 13 is removed by rinsing the substrate in a solvent by applying ultrasonic waves at a proper temperature. Because of the effects of the ultraviolet light applied to the sticking substance 13 on the discharge port surface, the sticking substance 13 on the discharge port surface can be removed through rinsing. Thus, as shown in FIG. 4E, the sticking substance 13 is removed from the discharge port surface.

Lastly, necessary electric connection (not shown) is carried out to complete manufacturing of the inkjet recording head.

Figure 5:
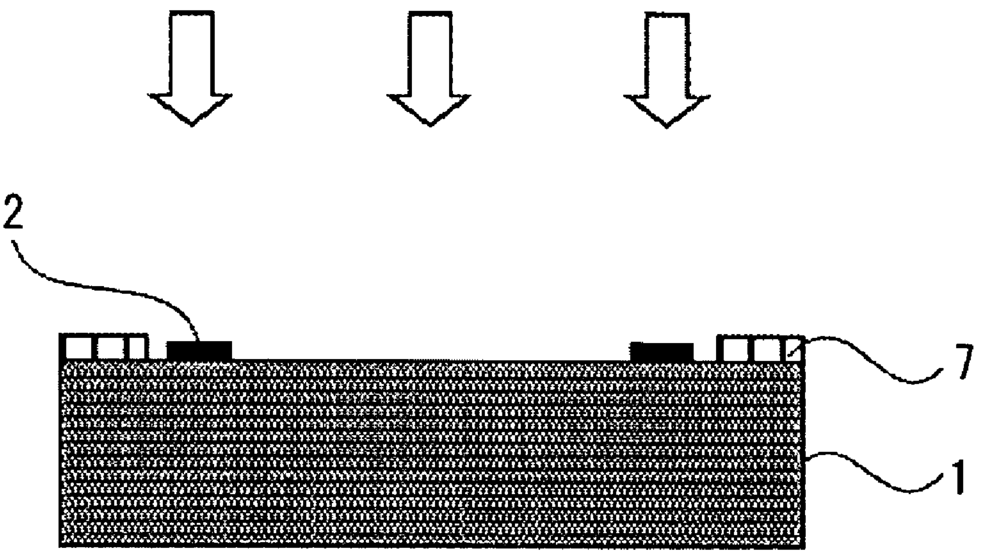
FIG. 5 is a sectional diagram illustrating an example of a method for manufacturing the inkjet recording head according to the exemplary embodiment of the present invention.

After the process of FIG. 3C, as shown in FIG. 5, the patterned organic material layer 7 can be irradiated with ultraviolet light to partially destroy the resin forming the organic material layer 7 to make molecular weight low beforehand. Especially, only the surface can be partially destroyed.

Accordingly, in the process of FIG. 3D, the part of the organic material layer 7 irradiated with the ultraviolet light can be dissolved more easily in the solvent in which the soluble resin 9 to be applied on the substrate 1 is dissolved. It is understood that the molecular weight of the part of the organic material layer 7 irradiated with the ultraviolet light is lowered. In the process of FIG. 4C, sticking substances derived from the organic material layer 7 become smaller. Thus, in the process of FIG. 4D and after, removal of the sticking substance 13 can become easier.

For the flow path forming method, the following method may also be used in place of the method shown in FIGS. 3A to 3H.

Each of FIGS. 6A to 6H is a sectional diagram illustrating an example of a method for manufacturing a recording head according to another exemplary embodiment of the present invention. These sectional diagrams are views cut similar to the cross section of FIGS. 3A to 3H and FIG. 4A to 4E.

Figure 6A:
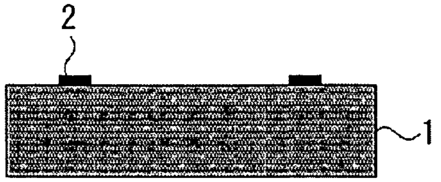
FIGS. 6A to 6H are sectional diagrams illustrating an example of a method for manufacturing the inkjet recording head according to the exemplary embodiment of the present invention.
Figure 6B:
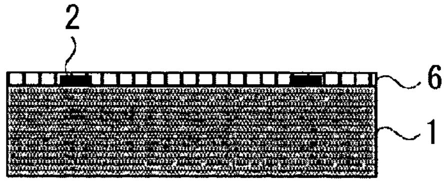
Figure 6C:

In FIGS. 6A to 6C, processes similar to those of FIGS. 3A to 3C are carried out. The process shown in FIG. 5 can also be carried out.

Figure 6D:
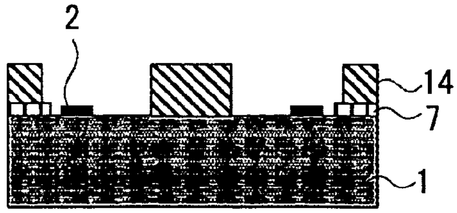

Then, as shown in FIG. 6D, a side wall 14 of a flow path is formed on an organic material layer 7, or over the organic material layer 7 and a substrate 1.

Figure 6E:
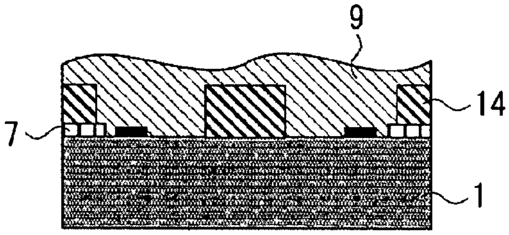

As shown in FIG. 6E, a soluble resin 9 fills a part to be a flow path 8 to form a resin layer 9 which covers the organic material layer 7 and the side wall 14. Even if in a solution state stacked on the substrate 1 by application, the resin layer 9 becomes solid after a solvent is evaporated. The solvent of the resin layer 9 may provide the aforementioned effect of lowering molecular weight to the organic material layer 7. This effect may cause subsequent generation of sticking substance in a discharge port surface.

Figure 6F:
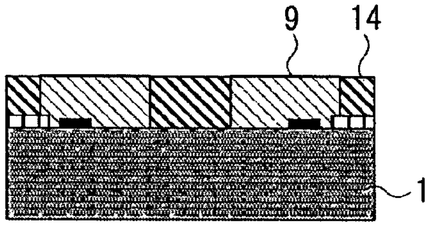

The resin layer 9 is polished toward the substrate 1 until the side wall 14 is exposed. Through this process, as shown in FIG. 6F, the side wall 14 and the resin layer 9 are planarized. For the polishing method, for example, a chemical mechanical polishing (CMP) process can be used.

Figure 6G:
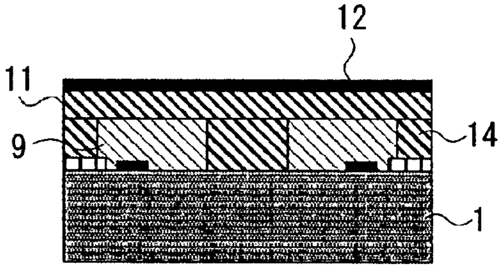

As shown in FIG. 6G, on the side wall 14 and the resin layer 9, a cover layer 11, serving as a member for forming a discharge port, and a water-repellent layer 12 if necessary are formed.

Figure 6H:
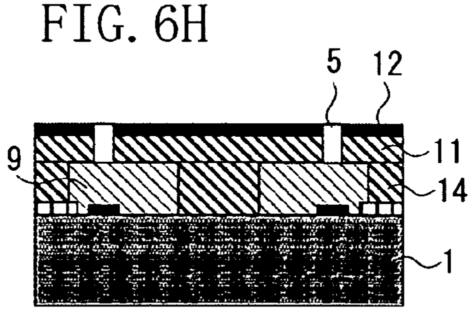

As shown in FIG. 6H, a discharge port 5 is formed.

The discharge port 5 can be formed by, for example, applying a photosensitive resin on the resin layer 9 by solvent-coating process, and patterning the resin by exposure.

From a state of FIG. 6F, a member in which a discharge port is already formed can also be provided on the side wall 14 and the resin layer 9 to obtain a state of FIG. 6H.

Thereafter, the resin layer 9 is removed to form a flow path 8. This process may be carried out by processing the resin layer 9 with the above described method for forming the pattern 10 as shown in FIGS. 4A to 4C.

In this process, a sticking substance 13 generated on the discharge port surface can be removed or reduced by the method shown in FIGS. 4D and 4E.

Examples of the present invention will be described in more detail.

EXAMPLE 1

First, a substrate 1 on which an electrothermal converter was disposed as an energy generating element 2 was prepared (FIG. 3A).

A polyether amide resin (HIMAL 1200 of Hitachi Chemical Co., Ltd., N-methyl-2-pyrrolidone and butyl cellosolve acetate were used as solvents) was applied on the substrate 1 (FIG. 3B).

The substrate 1 was baked at 100° C. for 30 minutes, and then at 250° C. for 60 minutes to form a film with a thickness of 2 μm.

A photosensitive positive type resist was applied on the polyether amide organic material 6 by spin-coating, and then patterned to form a photosensitive positive type resist pattern. The polyether amide resin was etched by using the photosensitive positive type resist pattern, and then the photosensitive positive type resist was peeled off to form an organic material layer 7 of the patterned resin (FIG. 3C).

Polymethyl isopropenyl ketone (ODOUR-1010A of Tokyo Ohka Kogyo Co., Ltd., using cyclohexanone as a solvent) was applied on the substrate 1 and the organic material layer 7 by spin-coating (solvent coating). Then, the substrate 1 was baked at 100° C. for 6 minutes to form a polymethyl isopropenyl ketone resin layer 9 with a thickness of 16 μm (FIG. 3D).

The polymethyl isopropenyl ketone resin layer 9 was irradiated with ultraviolet light, developed by methyl isobutyl ketone, and patterned to form a pattern 10 of a flow path (FIG. 3E).

On the substrate 1 having the organic material layer 7 and the pattern 10 formed therein, the following composition of matter was applied by spin-coating, and the substrate 1 was baked at 60° C. for 9 minutes to form a cover layer 11 with a thickness of 26 μm (FIG. 3F).

Epoxy resin EHPE 3150 (Daicel Chemical Industries, Ltd.)
Silane coupling agent A-187 (Nippon Unicar Co., Ltd.)
Photoacid generating agent SP-172 (ADECA Co., Ltd.)
Coating solvent xylene Silane prepared by a condensation product of hydrolyzable silane was applied on the cover layer 11 by solvent-coating to form a water-repellent layer 12 (FIG. 3G).

The cover layer 11 and the water-repellent layer 12 were exposed by an exposure amount of 0.14 J/cm$^2$, and then the substrate 1 was baked at 90° C. for 4 minutes. Then the substrate 1 was developed by using a mixed solvent of methyl isobutyl ketone and xylene to form a discharge port 5 (FIG. 3H). Then, the substrate 1 was baked for 60 minutes.

By using an aqueous solution of tetra methyl ammonium hydride (TMAH), the substrate 1 was etched by silicon anisotropic etching to form a supply port 3 (FIG. 4A).

The water-repellent layer 12 was irradiated with ultraviolet light with 27 J/cm$^2$ (FIG. 4B).

The ultraviolet light was irradiated by a full exposure unit (CE-6000) of Ushio, Inc., which can irradiate with the ultraviolet light having short wavelengths of 300 nm or lower.

Irradiation time can be calculated by dividing a designated irradiation amount by a total irradiation intensity value. The total irradiation intensity value is a total of irradiation intensities automatically measured by an apparatus at each wavelength from 220 nm to 320 nm of ultraviolet light.

Ultrasonic waves were applied to the substrate 1 at 40° C. using methyl lactate in the wet removing apparatus, and the polymethyl isopropenyl ketone pattern 10 was removed (FIG. 4C).

The substance 13 sticking to the surface of the water-repellent layer 12 was irradiated with ultraviolet light at an irradiation amount of 18 J/cm$^2$. This process cuts off a molecular chain of a substance sticking to the surface of the water-repellent layer 12 and enables removal of the substance (FIG. 4D).

The ultraviolet light was irradiated by the full exposure unit (CE-6000) of Ushio, Inc., which can irradiate with the ultraviolet light having short waves of 300 nm or lower. Irradiation time can be calculated by dividing a designated irradiation amount by a total irradiation intensity value. The total irradiation intensity value is a total of irradiation intensities automatically measured by the apparatus at each wavelength from 220 nm to 320 nm of ultraviolet light.

In the wet removing apparatus, the substrate 1 was rinsed in methyl lactate by applying ultrasonic waves having a frequency of 200 kHz and sound pressure of 30 mV or more at 40° C. to remove the sticking substance 13 (FIG. 4E).

Then, the substrate 1 was baked to completely cure the cover layer 11.

Lastly, necessary electric connection (not shown) was carried out to complete manufacturing of an inkjet recording head.

EXAMPLE 2

This example was for improving removability of a substance sticking to a discharge port surface.

Processes shown in FIGS. 3A to 3C were similar to those of the Example 1.

As shown in FIG. 5, an organic material layer 7 formed on a substrate 1 was irradiated with ultraviolet light. The ultraviolet light was irradiated by the full exposure unit (CE-6000) of Ushio, Inc., which can irradiate with the ultraviolet light having short waves of 300 nm or lower. Irradiation time can be calculated by dividing a designated irradiation amount by a total irradiation intensity value. The total irradiation intensity value is a total value of irradiation intensities automatically measured by the apparatus at each wavelength from 220 nm to 320 nm of ultraviolet light.

Processes thereafter were similar to those of the Example 1.

COMPARATIVE EXAMPLE

A recording head was manufactured without irradiating a sticking substance of a discharge port surface with ultraviolet light. In other words, the process of FIG. 4D was not carried out. Other processes were similar to those of the Example 1.

The inkjet recording heads according to the above described examples and comparative example were prepared in plural each.

Evaluation

First, the discharge port surfaces of the recording heads were compared. In the recording head of the example 1, generation of a small amount of sticking substance of 0.05 μm or less around the discharge port was observed in some cases. In the recording head of the example 2, the amount of sticking substance was smaller than that of the example 1. It is understood that removal of the sticking substances became easier by irradiating discharge ports with ultraviolet light and rinsing since the molecular weight of the sticking substances were lowered by irradiation of ultraviolet light to the organic material layer 7 on the substrate. In the recording head of the comparative example, the amount of sticking substances was greater and sizes of the sticking substances were larger, i.e., 0.05 to 0.2 μm, than the recording heads of the examples 1 and 2.

The recording heads of the examples 1 and 2 were immersed in a pigmented ink under an environment of a temperature of 30° C. and humidity of 80% for a month, and then mounted on a recording apparatus to carry out printing. The recording heads of the examples 1 and 2 could discharge ink droplets to desired impact positions and a good printing result was obtained. A printing operation under the same conditions as the examples 1 and 2 was carried out for the recording head of the comparative example. In some cases, desirable printing results could not be obtained. The unsuccessful printing may be due to randomness of ink droplets caused by the sticking substance observed in the discharge port surface.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-162488 filed Jun. 20, 2007, which is hereby incorporated by reference herein in its entirety.

What is claimed is:

1. A method for manufacturing a liquid discharge head including a discharge port adapted to discharge liquids and a flow path forming member defining a flow path communicating with the discharge port, the method comprising:

applying an organic material on a substrate;

patterning the organic material for forming an organic material layer;

irradiating the organic material layer with ultraviolet light to partially destroy a surface of the organic material layer;

applying a soluble resin on destroyed part of the surface of the organic material layer to form a resin layer;

patterning the resin layer to form a pattern with a shape of the flow path;

forming a cover layer as the flow path forming member to cover the pattern;

forming the discharge port in the cover layer to expose a part of the pattern from the discharge port; and eluting the pattern from the discharge port to form the flow path.

2. The method according to claim 1, further comprising irradiating an entire surface of the discharge port opening of a member for forming the discharge port with the ultraviolet light.

3. The method according to claim 1, wherein the organic material is polyether amide.

4. The method according to claim 3, further comprising using cyclohexanone as a solvent for applying the soluble resin.

5. The method according to claim 1, further comprising irradiating a substance, sticking to a surface of the flow path forming member on which the discharge port is formed, with ultraviolet light to remove the sticking substance, wherein the substance contains at least the organic material.

6. The method according to claim 5, wherein the sticking substance contains a compound to form the resin layer.

7. The method according to claim 6, wherein the sticking substance is a compatible mixture of the compound and the organic material.

8. The method according to claim 7, further comprising removing the sticking substance by rinsing with a solvent used for eluting the pattern.

9. A method for manufacturing a liquid discharge head including a discharge port forming member having a discharge port formed therein to discharge liquids and a side wall forming member having a side wall of a flow path formed therein to communicate with the discharge port, the method comprising:

applying an organic material on a substrate;

patterning the organic material for forming an organic material layer;

irradiating the organic material layer with ultraviolet light to partially destroy a surface of the organic material layer;

providing the side wall forming member on the destroyed part of the surface of the organic material layer to partially expose the organic material layer;

applying a soluble resin to form a resin layer, wherein the resin layer fills a part which becomes the flow path and covers the organic material layer and the side wall forming member;

polishing the resin layer toward the substrate to expose a part of the side wall;

providing the discharge port forming member on the side wall and the resin layer; and eluting the resin layer from the discharge port to form the flow path.

10. The method according to claim 9, further comprising irradiating a substance, sticking to a surface of the flow path forming member on which the discharge port is formed, with ultraviolet light to remove the sticking substance, wherein the substance contains at least the organic material.

11. The method according to claim 10, further comprising removing the sticking substance by rinsing with a solvent used for eluting the resin layer.

* * * * *